April 7, 1970  D. J. HELM  3,505,596
HAND TYPE TACHOMETER SELECTIVELY USABLE AS AN INSTALLED
TACHOMETER SYSTEM Filed Jan. 5, 1968  2 Sheets-Sheet 1

INVENTOR.
DOUGLAS J. HELM
BY
Williamson, Palmatier
& Bains
ATTORNEYS

April 7, 1970             D. J. HELM            3,505,596
HAND TYPE TACHOMETER SELECTIVELY USABLE AS AN INSTALLED
TACHOMETER SYSTEM
Filed Jan. 5, 1968                                    2 Sheets-Sheet 2

INVENTOR.
DOUGLAS J. HELM
BY
Williamson, Palmatier
& Bains ATTORNEYS

United States Patent Office 3,505,596
Patented Apr. 7, 1970

1

3,505,596
HAND TYPE TACHOMETER SELECTIVELY USABLE AS AN INSTALLED TACHOMETER SYSTEM
Douglas J. Helm, Minneapolis, Minn., assignor to Zero-Max Industries, Inc., South Minneapolis, Minn., a corporation of Minnesota
Filed Jan. 5, 1968, Ser. No. 695,987
Int. Cl. G01p *3/46*
U.S. Cl. 324—70          5 Claims

ABSTRACT OF THE DISCLOSURE

A tachometer for measuring the rate of mechanical motion of a device, and including a direct current generator having output contacts for ready and releasable connection with electrical conductors of an indicator. A belt and pulley drive interconnecting the generator armature shaft and the output shaft of the device to be measured providing a direct one-to-one drive between the generator and the device to be tested. The direct current generator having a minimum commutator ripple loss thereby permitting extremely accurate and stable measurement of devices even at relatively low speeds.

---

Figure 1:
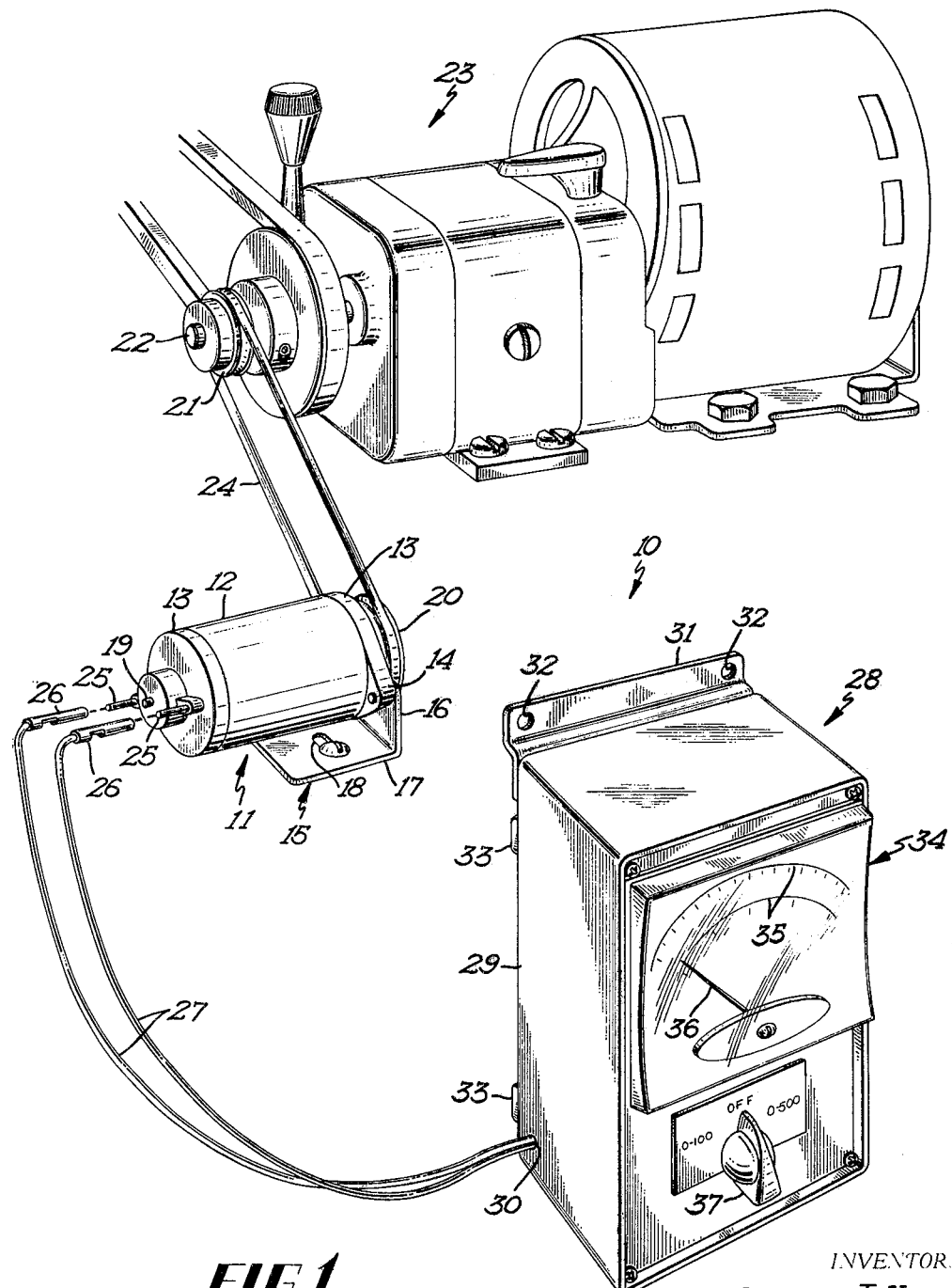

An object of this invention is to provide a novel and improved tachometer, of simple and inexpensive construction, which is capable of accurate and stable measurement of any mechanical motion or output variation of a device, even when such devices are operating at very low rates or speeds.

Another obpect of this invention is to provide a novel portable and inexpensive tachometer including an indicator and a D.C. generator capable of direct driving connection with a device to be measured, and which requires no speed increase means but permits accurate stable measurement even when used to measure very low speeds.

A further object of this invention is the provision of a novel tachometer system which may be used as an installed tachometer system or may be used as a hand type tachometer system.

Another object of this invention is to provide a novel and improved tachometer which may be readily connected to the device to be measured selectively for counterclockwise or clockwise input, and which is arranged and constructed to permit measurements of speeds, feed rates and the like at points remote from the device being measured whereby the tachometer is adapted for a wide range of uses.

Figure 2:
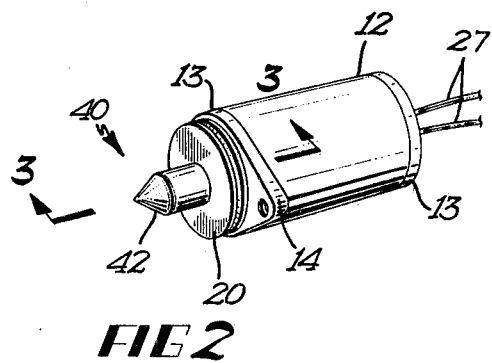
Figure 3:
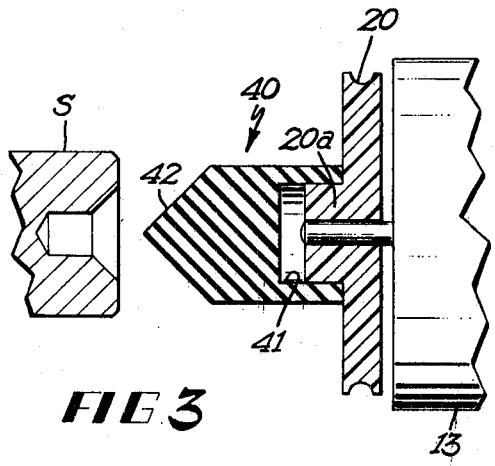
Figure 4:
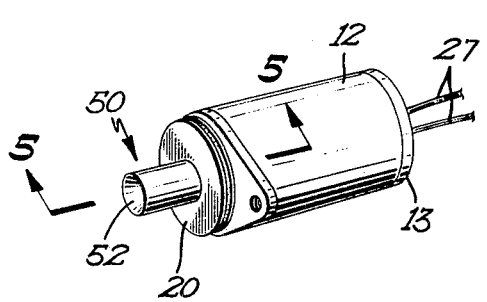
Figure 5:
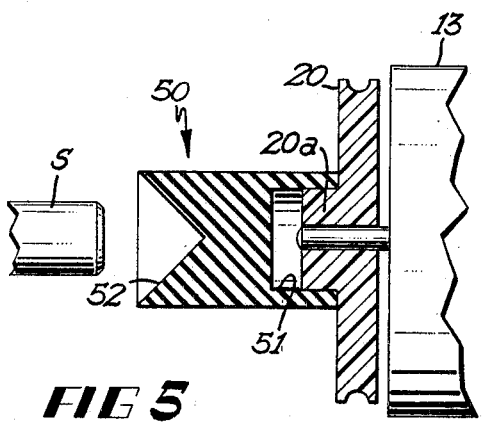
Figure 6:
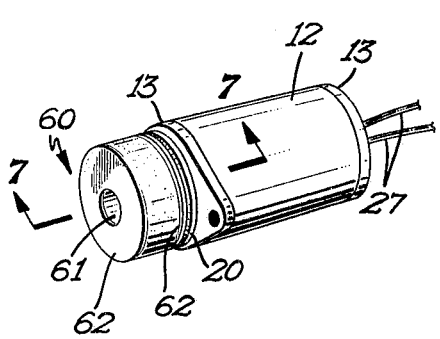
Figure 7:
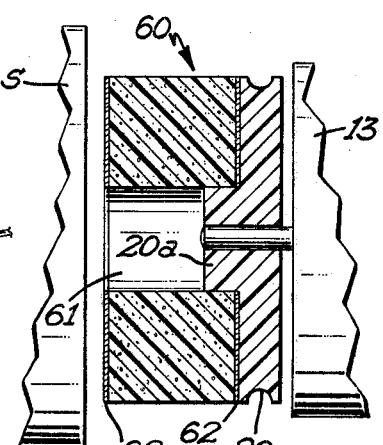

These and other objects and advantages of this invention will more fully appear from the following description made in connection with the accompanying drawings wherein like reference characters refer to the same or similar parts throughout the several views, and in which:

FIG. 1 is a perspective view of the novel tachometer illustrating one manner of use thereof, FIG. 2 is a perspective view of the generator of the tachometer illustrating one form of coupling element which is mounted on the hub of the drive pulley thereof, FIG. 3 is a cross-sectional view on an enlarged scale taken approximately along lines 3—3 of FIG. 2 and looking in the direction of the arrows, FIG. 4 is a perspective view of the generator illustrating a modified form of a coupling element mounted on the hub of the drive pulley, FIG. 5 is a cross-sectional view on an enlarged scale taken approximately along line 5—5 of FIG. 4 and looking in the direction of the arrows, FIG. 6 is a perspective view of a generator illustrating a further embodiment of the coupling element mounted on the drive pulley, and FIG. 7 is a cross-sectional view taken approximately along line 7—7 of FIG. 6 and looking in the direction of the arrows.

Referring now to the drawing, it will be seen that one embodiment of the novel tachometer, designated generally by the reference numeral 10, is thereshown. The tachometer 10 includes a D.C. generator 11 which is comprised of a generally cylindrical metallic housing 12 having disc shaped nonmetallic end walls 13, preferably formed of plastic or the like. One of the end walls 12 has a pair of apertured ears 14, integrally formed therewith to permit ready connection thereof to one leg 16 of an L-shaped bracket 15. It is also pointed out that the ears 14 may be attached directly to a panel or the like by suitable bolts. Suitable attachment bolts may be used to secure the end wall 13 to the bracket 15. The other leg 17 of the bracket 15 has a pair of elongate slots 18 formed therein to permit ready mounting of the generator in close proximity to the device to be measured.

The housing 12 serves to sealingly enclose the components of the D.C. generator including the field magnets, the armature and the commutator. The armature shaft 19 projects exteriorly of the housing 12 through the end walls 13. A pulley 20 is mounted in frictional engagement on one end of the armature shaft 19 exteriorly of the housing 12 and this pulley is preferably constructed of a nonmetallic material preferably plastic.

The tachometer also includes a plurality of drive pulleys each having an outside diameter corresponding to the diameter of the driven pulley 20 and each having an inside diameter which corresponds to the diameter of a conventional size output shaft of various devices. Although only one drive pulley 21 is shown, it is pointed out that this drive pulley has an inside diameter which is different from the inside diameter of pulley 20. In the embodiment shown, the pulley 21 is mounted upon the output shaft 22 of a variable speed drive device 23. An endless drive member 24 is trained about pulleys 20 and 21 to thereby provide a direct one-to-one drive between the device to be measured and the generator 11.

A pair of pin type contacts 25 project axially through one of 'the end walls 13 and are connected through brushes to the generator commutator. The pin type contacts 25 are adapted to be frictionally engaged by a pair of sleeve type contacts 26 each being secured to one end of one of a pair of elongate conductors 27. The conductors 27 extend through an opening 30 of a housing 29 of an indicator 28. The housing 29 is of generally rectangular configuration and is preferably made of a suitable rigid plastic material. In the embodiment shown, the electrical conductors 27 may be several feet in length and may be stored within the housing 29. With this arrangement, a device to be tested may be tested at a point remote from its situs.

A mounting bracket is rigidly secured to the upper portion of the rear wall of the housing 28 and is provided with suitable apertures 32 therein to permit ready mounting of the indicator upon any suitable supporting structure. With this arrangement, the indicator may be mounted vertically, angularly, or for that matter it may be mounted in any relative position with respect to the associated supporting structure. Suitable resilient bumper elements 33 are secured to the rear surface of the rear wall of the housing and serve to keep the indicator from creeping if it is merely placed on a surface of suporting structure and the supporting structure is subjected to vibrations or the like.

The indicator 28 is provided with an indicator dial 34 which has a calibrated dual scale 35 on its face. In the embodiment shown, the dual scale is arranged in an arc and the indicator is also provided with an indicator needle which is swingable through through an arc of approximately 100°. It is pointed out that the indicator is comprised of an ammeter although a suitable meter such as a voltmeter may also be used. It is further pointed out that although a calibrated dual scale is provided which is arranged in an arc, the same scale may be a straight line type scale or alternatively the indicator may be provided with a digital read out system.

It will also be noted that in the embodiment shown the indicia or numbers of one scale comprises a 0–100 r.p.m. scale and the indicia of the other scale is for a 0–500 r.p.m. The numbers of the 0–100 r.p.m. scale are positioned above the calibrated indicia and the numbers of the 0–500 r.p.m. are positioned below the calibrated indicia. The particular range of speeds to be measured are exemplary and in this regard, it should be pointed out that the particular meter used could be provided with a different range of speeds to be measured. Thus, if desired, one scale could measure speeds from 1000 to 5000 r.p.m. or alternatively, from 400 to 2000 r.p.m. The particular scale involved would depend upon the range of speeds to be measured and is optional. It is desirable with the present invention to provide an indicator having a meter which is capable of measuring accurately and effectively relatively low speeds or rates of a mechanical motion, preferably revolving movement.

As pointed out above, the indicator includes an ammeter and this ammeter is provided with a switch 37 to permit the voltage input to selectively read in terms of one or the other of the scales. With this arrangement, a low rate of speed or high rate of speed may be selectively read by the indicator. The selector switch 37 may be readily shiftable from an off position to interconnect the ammeter of the indicator for a low speed or high speed range determination or any other output variation which is to be measured. In the embodiment shown, it will be understood that the 0–100 r.p.m. scale is selected for measuring the slower speeds and the ammeter of the indicator is extremely sensitive to any voltage changes when adapted to be this type of measurement. The indicator 28 in addition to including an ammeter is also provided with a variable resistor or rheostat which may be selectively switched into the circuit by the switch 37 so that the ammeter is conditioned for less sensitive response, but can, of course, be used for measuring a wider range of output variations such as shaft speeds.

It is pointed out that the generator 11 may be connected to the shaft to be measured to permit clockwise or counterclockwise drive of the generator armature. Since the electrical conductors 27 are provided with quick coupling means for ready connection with the contact pins of the generator, it is only necessary to reverse the position of the leads to permit change in the direction of the drive of the generator armature. As an alternative arrangement, a reversing switch may be provided to permit reversal of the direction of the drive of the generator. It is also pointed out that the generator 11 has very little current ripple or loss because of the construction of the generator. To this end it is pointed out that the generator armature has a lapped post winding pattern which results in a commutator flutter or ripple of approximately 0.5% loss of compared to a current ripple of approximately 2% which is typical of most commercial generators. In this regard, the particular generator used is a network or modification of a conventional permanent magnet D.C. motor.

During use, the generator will be mounted in close proximity to the device to be measured directly by the ears 14 or by means of the mounting bracket 15 and a drive pulley 21 will be selected that has a diameter corresponding to the diameter of the shaft on which it is to be mounted. The endless drive member 24 is trained about the pulley 21 and the pulley 20 of the generator thus permitting direct drive of the generator by the device to be measured. The indicator may be located at a remote position with respect to the device being measured and may also be mounted upon a suitable mounting structure by means of the bracket 31.

When it is desirable to make a low speed range determination, the switch 37 is shifted to the lower range scale where a ready and accurate determination of the shaft velocity may be readily made. The fact that an accurate low speed determination can be made with a direct drive system is one of the unique features of the present invention. In the event that a high speed range is to be measured, it is merely necessary to shift the switch 37 to the higher range position. In the event the generator 11 is arranged for clockwise drive and the tachometer is to be used to measure a driven device where clockwise drive of the generator is either impossible or inconvenient, the generator may be arranged for counterclockwise drive by merely changing the positions of the sleeve type contacts 26 with respect to the pins contacts 25. As pointed out above a reversing switch may be added in the circuit to accomplish reversing of the generator drive.

It is also pointed out that the present tachometer system may also be used as a hand-type tachometer wherein the generator 11 will be held by a user for coupling to the output shaft for other deviceos to be measured.

Referring now to FIGS. 2 and 3 it will be noted that the driven pulley 20 is provided with a hub 20a which projects axially forwardly or outwardly from the outer face of the pulley. The male type coupling element 40 preferably formed of a suitable resilient material such as rubber or the like is provided with a cylindrically shaped socket 41 at one end thereof. The hub 20a is positioned in snug fitting relation within the socket 41 to mount the coupling element 40 on the pulley. The outer end of the coupling element 40 is of convex configuration and in the embodiment shown is of substantially conical configuration. This convex outer end 42 of the coupling element 40 is adapted to be pushed into the conventional bore or axial recess of the output shaft S of the device to be measured. With this arrangement, a user may hold the generator so that the coupling element 40 and specifically the convex end 42 thereof is urged into the bore of the shaft of the device to be measured to form a coupling between the generator and shaft. The coupling element 40 is especially adapted for use when the tachometer is used as a hand-type tachometer system and where the shaft S comprises a relatively large shaft.

Referring now to FIGS. 4 and 5 it will be seen that a further embodiment of the coupling element is thereshown and this coupling element is designated by the referenced numeral 50. It will be noted that the coupling element 50 is provided with a suitable cylindrical socket 51 therein. The hub 20a of the driven pulley 20 is positioned in snug fitting relation within the socket 51 so that the coupling element 50 is mounted on the driven pulley and projects axially therefrom. The other end of the coupling member 50 has a conically shaped recess 52 therein which is adapted to receive the end of the shaft S in frictional engagement therewith. It is pointed out that the coupling element 40 as well as the coupling 50 are each of generally cylindrical configuration and each is formed of a resilient material. It will be seen that when the generator is held by a user so that the output shaft S of the device to be measured is frictionally engaged within the concave conical recess 52, then the drive is transmitted directly through the coupling member 50 to the generator. The coupling element 50 is adapted for use where the output shaft S of the device to be measured is of relatively small size.

Referring now to FIGS. 6 and 7 it will be seen that a further embodiment of the coupling element is thereshown and this coupling element is designated generally by the reference numeral 60. A coupling element 60 is of generally cylindrical configuration and has a cylindrical bore 61 therethrough. The bore 61 is of a size to snugly receive the hub 20a of the driven pulley 20 therein and thereby mount the coupling element on the driven pulley 20a. Opposite ends or faces of the coupling element 60 are also provided with an adhesive coating or layer 62 to thereby increase the capability of the coupling element 60 between the generator and the output shaft of the device to be measured.

In this regard it will be noted that the cylindrical layer or coating 62 on one face engages the outer face of the driven pulley 20 while the adhesive coating or face 62 at the other end thereof engages the outer end or face of the output shaft S of the device to be measured. This adhesive coating 62 at opposite ends of the coupling member is of the pressure sensitive type whereby a user may effect a coupling between the output shaft S of the device to be measured and the coupling element 60 by pressing the latter against the output shaft. Thus it will be seen that the coupling elements 40, 50 and 60 illustrated in FIGS. 2 through 7 permit the tachometer system to be used as a hand-type system in addition to its use as a fixed or mounted type installation.

From the foregoing description, it will be seen that the tachometer is adaptable for use in accurately determining the speed of a revolving shaft over a relatively wide speed range. It will also be noted that the tachometer, although being extremely accurate and sensitive in measuring speed ranges of revolvable shafts, is constructed of inexpensive components and elements.

Thus, it will be seen that I have provided a novel tachometer which is not only of simple and inexpensive construction, but one which functions in a more efficient manner than any heretofore known comparable device.

I claim:

1. A small portable compact tachometer for measuring the mechanical motion in a device, such as a variable speed drive device, comprising:
    a direct current generator including a housing,
    an armature in said housing including an armature shaft projecting exteriorly thereof,
    a first pulley on said shaft, said pulley having a cylindrical hub projecting axially therefrom, and defining a cylindrical mounting surface,
    a coupling element formed of yieldable material and having a concave socket in one end thereof receiving and engaging said hub therein to mount said coupling element on the hub, the other end of said coupling element defining a coupling surface for mating engagement with a complementary coupling surface on the shaft to be measured,
    a second pulley adapted to be mounted on a shaft whose speed is to be measured and adapted to be removed from the shaft, said pulleys having substantially the same outside diameter,
    an endless drive member trained around said pulleys to provide a direct drive to the armature shaft from the drive shaft to be measured, said coupling element interconnecting the armature shaft and the shaft to be measured when urged into engaging relation with the last-mentioned shaft, and after removal of the second pulley from the last-mentioned shaft, and after removal of the endless drive member from said pulleys, thereby permitting said tachometer to be used in an installed tachometer system or as a hand type tachometer system,
    an indicator, including a housing having an indicator dial, means on the indicator dial having graduated scale means, an indicator needle mounted in said indicator housing and being movable over the face of the dial adjacent said scale means, said scale means permitting selective accurate reading of low speeds of the shaft, and accurate reading of high speeds of the shaft,
    a pair of elongate electrical conductors connected with said indicator,
    means defining quick coupling electrical contacts on said conductors and generator to permit ready connection and release of the conductors with said generator whereby direct current generated by said generator will be conducted to said indicator, said indicator housing having a storage space therein wherein a major portion of the length of the electrical conductors may be removed therefrom,
    a switch element interposed in circuit controlling relation with said conductors and shiftable from an open position to one of a plurality of closed positions, the switch when in one of said closed positions permitting accurate measurement of the shaft's velocity within a low speed range and when in another of said closed position, permitting accurate measurement of the shaft velocity within a higher speed range.

2. The tachometer as defined in claim 1 wherein said coupling surface on said coupling element is of convex conical configuration.

3. The tachometer as defined in claim 1 wherein said coupling surface on said coupling element is of concave conical configuration.

4. The tachometer as defined in claim 1 wherein said quick coupling electrical contacts comprises pin and sleeve connectors, and said generator armature is adapted for clockwise or counterclockwise drive by selectively reversing the connection of the electrical conductors with the generator.

5. The tachometer as defined in claim 1 and means on said generator housing to permit mounting of said generator housing in close proximity to the device to be measured.

References Cited

UNITED STATES PATENTS

| 277,179 | 5/1883 | Weston | 73—519 |
| 617,418 | 1/1899 | Hanchett | 324—156 |
| 1,266,487 | 5/1918 | Kolff | 324—70 |
| 1,798,823 | 3/1931 | Weston | 324—70 |
| 2,285,006 | 6/1942 | Bowser | 324—70 |
| 2,502,712 | 4/1950 | Floyd | 324—70 |

FOREIGN PATENTS

| 462,945 | 2/1914 | France. |
| 557,248 | 11/1943 | Great Britain. |
| 1,016,966 | 10/1957 | Germany. |

RUDOLPH V. ROLINEC, Primary Examiner

MICHAEL J. LYNCH, Assistant Examiner

U.S. Cl. X.R.

73—529